United States Patent [19]
Kiany

[11] Patent Number: 6,004,434
[45] Date of Patent: *Dec. 21, 1999

[54] METHOD OF RECYCLING CLEANING SOLVENT

[75] Inventor: Esfandiar Kiany, Chicago, Ill.

[73] Assignee: Safety-Kleen Corp., Elgin, Ill.

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/271,841

[22] Filed: Jul. 7, 1994

[51] Int. Cl.$^6$ .............................. B01D 3/34; B01D 3/42; B01D 21/00; C11D 7/50
[52] U.S. Cl. ............................ 203/3; 134/10; 134/12; 134/26; 203/55; 203/56; 203/63; 203/64; 203/94; 203/98; 208/180; 208/184; 210/711; 210/712; 210/727; 210/728; 210/729
[58] Field of Search ...................... 210/711, 712, 210/7.74, 708, 671, 674, 727–729; 203/56, 55, 63, 64, 1, 3, 71, 51, 94, 98, 100; 585/864; 134/10, 12, 109, 13, 26, 40; 208/180, 184, 188; 510/108

[56] References Cited

U.S. PATENT DOCUMENTS

| | | |
|---|---|---|
| 1,766,067 | 6/1930 | De Groote et al. . |
| 2,552,528 | 5/1951 | De Groote . |
| 2,552,529 | 5/1951 | De Groote . |
| 2,900,350 | 8/1959 | Kirkpatrick . |
| 2,944,982 | 7/1960 | De Groote et al. . |
| 2,996,551 | 8/1961 | De Groote et al. . |
| 3,110,736 | 11/1963 | De Groote et al. . |
| 3,110,737 | 11/1963 | De Groote et al. . |
| 3,877,893 | 4/1975 | Sweny et al. . |
| 4,277,352 | 7/1981 | Allison et al. . |
| 4,306,981 | 12/1981 | Blair, Jr. . |
| 4,321,146 | 3/1982 | McCoy et al. . |
| 4,321,147 | 3/1982 | McCoy et al. . |
| 4,407,706 | 10/1983 | Merchant, Jr. et al. . |
| 4,407,707 | 10/1983 | Merchant, Jr. et al. . |
| 4,416,754 | 11/1983 | Merchant, Jr. et al. . |
| 4,477,286 | 10/1984 | Rossmann et al. . |
| 4,551,239 | 11/1985 | Merchant et al. . |
| 4,737,265 | 4/1988 | Merchant, Jr. et al. . |
| 4,938,877 | 7/1990 | Bock et al. ............................ 210/723 |
| 4,940,494 | 7/1990 | Petit et al. ............................ 134/10 |
| 5,071,454 | 12/1991 | Streitberger et al. . |
| 5,256,305 | 10/1993 | Hart . |
| 5,447,638 | 9/1995 | Holdar et al. ........................ 210/728 |

Primary Examiner—Virginia Manoharan
Attorney, Agent, or Firm—Vedder, Price, Kaufman & Kammholz; James T. FitzGibbon

[57] ABSTRACT

A method of treating cleaning solvent used to clean mechanical parts. The method includes adding to the cleaning solvent a treating composition selected from the group of $C_5$–$C_{14}$ alcohols, $C_2$–$C_8$ dials, $C_{10}$–$C_{14}$ polyols, and $C_4$–$C_{14}$ glycol ethers, and mixtures thereof. A further embodiment includes the foregoing plus adding a clarifying agent from the group of aromatic, aliphatic and alkaryl sulfonic acids and sulfonic acid salts, esterified polyols, and alkyl phenol formaldehyde resins capped with alkoxy groups. The solvent is vaporized and condensed to effect recycling thereof without adding substituted quantities of treating composition to the solvent.

22 Claims, 1 Drawing Sheet

CHART 1

CHART 1

CHART 2

METHOD OF RECYCLING CLEANING SOLVENT

BACKGROUND OF THE INVENTION

The present invention relates generally to automotive, industrial, and commercial parts cleaning, and, more particularly, to improved formulations for increasing the effectiveness and recyclability of cleaning solvents.

In industry today, there has been an increasing awareness of the importance of washing mechanical parts. In almost every repair, reconstruction, and rebuilding of motors, engines, and/or machines, it is necessary to clean oily, greasy, or otherwise dirty or contaminated parts before they can be repaired and reassembled. Further, in a number of cases, machining and refabricating operations, particularly those carried out on metal parts, leave residues or contaminants which are desirably cleaned before the part or component in question is reassembled or otherwise the subject of a completed operation.

In most cases, the kind of dirt and contamination which has accumulated on metal parts is that of an oily, greasy residue. In the case of automotive, truck, agricultural, and earth-moving construction machinery components, the parts in question gradually become covered with oil or grease that has leaked from the crankcases or gear housings of the machines, and these in turn attract dust, sand, dirt, and other constituents of the environment in which they work. Almost all oils and greases have the capability not only of attracting dust and dirt, but also, in effect, of acting as an adhesive for these and other contaminants.

Normally, for reasons of rust prevention, and particularly for reasons of solubility, such parts, being possessed of an oily, greasy residue, are best cleaned using hydrocarbon-based solvent systems rather than aqueous systems. The use of aqueous systems calls for using large quantities of water and requires emulsifying the oil and grease that is, in effect, serving as a dirt binder. Such cleaning, while effective if conducted properly, involves time-consuming washing/emulsification/saponification steps followed by rinsing and subsequent application of a corrosion inhibitor coating. In addition, disposing of oil-containing residues is sometimes subject to prohibition or regulation.

Accordingly, rather than pursue this method, most parts are simply washed in a hydrocarbon-based solvent that is compatible with the oils and greases in question, and which therefore serves to remove the dirt quite rapidly and effectively. This is particularly true when combined with a scrubbing or mechanical agitation action, i.e., brushing or dipping and agitating of parts, or both. Where the solvent is confined to a recirculating washer, the solvent can be retained and collected for recycling so as not to require being disposed of in violation of environmental regulations.

In connection with the use of hydrocarbon-based solvents, certain problems arise. These include environmental and fire hazard concerns, one consequence of which has been the increasing use of relatively high flash point solvents. In many cases, these solvents used have a flash point of 100° F. or above and are primarily aliphatic in nature with a certain aromatic constituent. Newer solvents have a 150° F. or higher flash point and are predominantly or almost exclusively aliphatic.

Referring to the equipment used in parts washing, while simple dip tanks have been known to be used with some effectiveness, the most cost- and labor-effective method of small-scale parts washing, (i.e., that carried on in maintenance, repair, and rebuild shops and garages and industrial fabrication and assembly facilities of all sizes), has been to use parts washers which include a sink or the like positioned atop a reservoir of hydrocarbon-based solvent and wherein this solvent is circulated from the reservoir though a pump and directed over the parts being cleaned from a nozzle at the end of a conduit or the like. Parts washers using such hydrocarbon-based solvents include those of the general type described in U.S. Pat. No. 3,522,814, of which many hundreds of thousands have been sold and/or are in use.

Referring again to automotive, industrial, and commercial parts washing, when the cost of hydrocarbon-based solvent was very low and the regulatory atmosphere was somewhat lax, it was not uncommon to provide a rather crude filter to be used with such solvent and for the solvent to be changed by a route or serviceman every two to four weeks. The used solvent would be picked up by the route man, who then furnished a charge of new solvent for the parts washer. This cycle would commonly be repeated on a two to twelve week cycle or as needed.

When hydrocarbon-based solvent prices were low, this was an economical, common sense approach to parts washing problems. The combination of the relatively crude filter and simple gravity settling provided a gross separation of contaminants which was satisfactory for the times in question. Now, however, hydrocarbon-based solvent costs are much higher, and environmental regulations are such that it is much more desirable to ensure maximum use and re-use of a particular charge of solvent. However, this desirable state of affairs has not heretofore been able to be fully achieved in practice.

One characteristic of parts washer solvent that has been subjected to even comparatively few washing cycles is that the dirt entrained therein includes finely dispersed particles, many of which may be of sub-micron size. While sand, gravel, metal filings, and the like cleaned from dirty or greasy parts rapidly settle out, a significant portion of the contaminants in solvent used for parts washing is comprised of very fine particles that are resistant to settling. As a result, while the solvent's cleaning effectiveness may not be impaired, due to the dispersed and unsettled contamination, it may be difficult to determine visually that the solvent can still be used effectively. Consequently, such solvent may be changed more often than needed.

If it were possible to achieve a greater separation of dirt and particles from the mass of solvent within a finite time, say fifteen minutes to one hour, the effectiveness and useful lifetime of much parts cleaning solvent would be greatly increased. It is possible that, by positioning the liquid pump inlet an appropriate distance from the bottom of the reservoir, if there were highly effective gravity separation of contaminants, the pump could continue to circulate comparatively clean solvent, while the case, the contaminants would continue to self-separate by gravity. Thus, the supernatant liquid within the reservoir would remain clean and be able to be used over a much longer period of time.

In speaking of reclamation of hydrocarbon solvents, being that the current regulatory atmosphere in some ways promotes this practice, when recycling of the hydrocarbon-based solvent used in parts cleaning is called for, i.e., by filtration, distillation of the solvent at a recycle center, and/or by various other commonly known methods, an economic price is extracted both for recycling very dirty solvent and also for distilling solvent that has sufficient solids suspended so as to be of reduced effectiveness in use as a cleaning material.

If it were the case that a greater separation of the dirt and particles in used or spent hydrocarbon-based solvent could be achieved, recycling would be simplified in that the major portion of the contaminants could be removed into a contaminant-rich layer by physical separation, thus reducing the accumulation of sludge in the distillation phase of recycling. Heat transfer would be better and equipment damage would be minimized if the solvent that was ultimately recycled by distillation were cleaner when entering the distillation phase of recycling.

While it is not known with certainty all the reasons why the contaminants in parts cleaning hydrocarbon-based solvent are apparently so highly resistant to gravity separation, it is known that modern motor oil, cutting and machining fluids, and grease formulations include detergent/dispersant additives which form a part of the dirt and grime which accumulates on mechanical parts, both inside and outside sealed machine areas. The detergent/dispersant additives remaining in these oil, fluid, and grease residues may serve to suspend fine contaminants within the cleaning solvent and prevent their separation by gravity or filtration.

A drawback with the concept of adding certain performance enhancing products to solvent for the purpose of separating therefrom suspended, fine-particle-size contaminants has been that of expense of the additive. Hence, since the main incentive to clarify solvents used in parts washing application is to economize on the use of solvent, primarily by creating particle separation that enables the supernatant layer of the solvent to be used for longer periods of time, if such a process involves considerable effort and expense, then it cannot be economically justified.

Moreover, if any treatment is such that it renders ineffective a primary requirement of the solvent, namely, that it be able to be recycled, then such additives or modifying compositions would be seriously disadvantageous. Accordingly, if a relatively persistent additive were able to be found, such an additive would have economic advantages in that it would be able to be used for a significant period of time.

Moreover, if an additive available which would not only be persistent in use, but which would remain in a solvent composition to and through a recycling phase, then such a composition would have an extremely important economic and ecological advantages.

In view of the inability of the prior art to have developed an additive composition for a cleaning solvent, particularly a parts washing solvent, which additive would be highly persistent in use, and might even survive recycling by distillation, an object of the present invention is to provide an improved petroleum or other solvent composition that includes a durable or persistent component that also aids contaminant particle separation.

A further object of the invention is to provide a solvent which will provide a combination of properties, namely, the ability to impart rapid agglomeration of dispersed fine particles in the solvent and which would survive recycling by distillation.

A further object of the invention to provide an enhanced solvent that greatly accelerates dirt and particle separation and remains effective after solvent reclamation and/or solvent recycling has been conducted by various methods, including distillation.

A still further object of the invention is to provide an enhanced solvent and/or solvent additive that facilitates easier initial separation of contaminants for more efficient and cost effective recycling, especially wherein the additive largely remains in a solvent supernatant layer rather than separately with agglomerated contaminants.

Another object of the invention is to provide a modified composition wherein a single additive, or combination of related additives, will serve to perform a solvent clarifying function in respect to fine particles and which additive will further remain present in the solvent during repeated distillative recycling.

Yet another object of the present invention is to provide a composition which, when added to a cleaning solvent, is compatible with other additives such as settling accelerants, as well as with impurities or other contaminants finding their way into parts washing solvent.

Another object of the invention is to provide a persistent additive for a solvent, which additive is effective in the presence of certain limited amounts of water and whose performance in some cases is enhanced by the presence of small portions of water.

A further object of the invention is to provide a composition which will form an azeotrope or constant boiling mixture with a range of solvent compositions so as to remain with solvent being distilled rather than being separated therefrom by distillation.

Yet another object is to provide a method of providing improved solvent performance, which method comprises treating cleaning solvent with an additive which will extend its service life, thereafter distilling the solvent after use to separate therefrom high boiling residues, and repeating this process periodically, occasionally adding a slight additional amount of the additive sufficient to return the solvent composition to its original specification.

Another object of the invention is to provide an additive which is compatible with and not harmful to equipment used in distillative recycling.

The foregoing and other advantages of the invention are achieved in practice by providing a solvent processing method which comprises adding to a body of solvent a treating composition comprising an active ingredient selected from the group consisting of $C_{14}$ and lower alcohols, $C_{14}$ and lower diols, $C_{14}$ and lower polyols, $C_{14}$ and lower glycol ethers, and mixtures of said alcohols, diols, polyols and glycol ethers, preferably of the $C_6$–$C_8$ variety, utilizing the solvent in a parts washing operation and periodically distilling the same to remove impurities, and, following distillation, determining the effective level of such additive in the composition, and periodically adding small amounts of said composition until the solvent composition has reached its original specification.

The manner which the foregoing objects and advantages of the invention are achieved in practice will become more clearly apparent when reference is made to the preferred manner of practicing the invention, as reflected in the examples set out below.

DESCRIPTION OF THE PREFERRED EMBODIMENTS OF THE INVENTION

Figure 1:
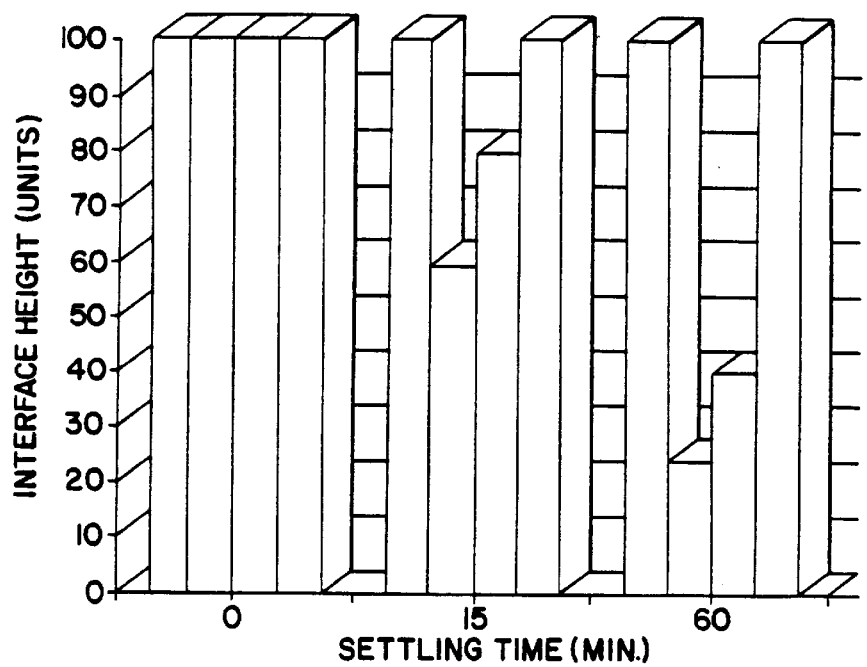
FIG. 1/Chart 1 shows the effect of active ingredients on the settling rate of suspended particles in spent P-150 parts washer solvent.

By way of background, the solvent treated in keeping with the invention is of a type which is used by the assignee of the present invention in connection with servicing mechanical parts washers. Most of these are of the type wherein a sink is positioned atop a reservoir in the form of a barrel and wherein a recirculating mechanism is provided whereby solvent from the reservoir is transported under pressure to a flexible conduit and nozzle line inside the sink. Other washers, such as dip tanks, immersion units or the like also use such solvent. Customarily, the solvent is primarily aliphatic but may contain up to 15 or 20 percent aromatic components, and has a flashpoint of 105° F. or higher. This is referred to herein as solvent "SK-105" or standard solvent. The aliphatic component usually is made up primarily of $C_8$–$C_{13}$ alkanes.

In other instances, to which reference will be made, a higher flashpoint solvent, such as a 99+ percent aliphatic hydrocarbon solvent, usually petroleum-based, is provided, and this solvent has a flashpoint of 140°–150° F. or higher. The hydrocarbons are usually a mix of $C_9$–$C_{14}$ alkanes. This solvent is sometimes referred to herein as solvent "P-150".

Ordinarily, pickup of used solvent for recycling purposes occurs incident to a scheduled service call or when users of the service encounter one of two conditions. One of these conditions results from a diminution in the effectiveness of the solvent for cleaning purposes when it becomes saturated, or nearly so, with solubilized contaminants such as oil, grease and/or other components that are truly soluble in the solvent. In such a case, effective solvent action is no longer possible; the solvent has exhausted its potential as a cleaning agent and is no longer effective. In such a case, recycling is the only choice left.

However, a much more common case is that the solvent simply appears too dirty and too contaminated with suspended particulates to continue to be effective. This judgment is usually based on visual observation. Between the time operations are begun with a fresh batch of solvent and the time the service call is made, evaporative losses, contamination from dirt of all kinds, water, etc. occurs; and a gradual dirtying of solvent takes place. This is a natural incident to washing parts in the automotive industry, and/or in manufacturing, construction, agriculture or like industries wherein ferrous and non-ferrous metal mechanical parts are customarily cleaned using parts washer solvent (hereinafter generically referred to as "PWS") in cleaning equipment designed for this purpose.

Certain of these experiments are referred to in detail herein, but in summary, it was determined that a certain amount of contamination will settle by gravity within the first half hour after agitation. Thereafter, untreated contaminants tend to remain somewhat uniformly dispersed throughout the mass of solvent, and additional time does not result in material clarification of the solvent. The dispersion depends on a particle size, but in a wide range of sizes, certain particles appear to remain suspended indefinitely. Typically, the total suspended solids ("TSS") in used PWS requiring service were about 1,000–14,000 ppm in the supernatant layer, depending on the application. This is, in effect, an end point beyond which self-cleaning by gravity does not occur.

For purposes of the following discussions of the nature and effect of particle size in solvent classification, the particle size range of solid contaminants suspended in PWS was divided into seven groups, ranging from 70+ microns to 0.45 microns, as is described later.

Regarding settlement rates generally, larger and more dense particles settle out more rapidly. Some particles are large and/or dense enough to settle without assistance in a finite time. Consequently, in a given specimen of solvent, as time passes, the concentration of suspended solids becomes somewhat less near the top of a column of such solvent. However, in general, with particles of 20 $\mu$ and smaller, these settling rates are so slow that the solvent appears uniformly dirty to the naked eye, and it is the accelerated settling of these particles with which the present invention is primarily concerned.

Solvents that were contaminated in this way were further analyzed and treated in a manner referred to in greater detail in copending applications Ser. Nos. 08/271,847, abandoned and 08/271,190, filed of even date herewith.

In such application, reference was made to treating the kinds of parts washer solvents just discussed with a so-called "Active Ingredient" additive in order to improve the separation of fine suspended particles from the body of the solvent. In addition, as set out in more detail below, the active ingredient additive also enhanced the soluability of certain so-called clarifiying agents to which reference is made elsewhere herein. Table 1, set forth below, lists ten such active ingredients, as follows:

TABLE 1

| LEGEND | ACTIVE INGREDIENT |
|---|---|
| AI-1 | 2-ethyl-1,3-hexanediol (EHD) |
| AI-2 | Diethylene glycol mono-butyl ether (DEGBE) |
| AI-3 | Propylene glycol n-butyl ether (PnB) |
| AI-4 | A mixture of 2 parts - AI-2 and 1 part AI-1 |
| AI-5 | 1-pentanol |
| AI-6 | 2-pentanol |
| AI-7 | Ethylene glycol |
| AI-8 | Diethylene glycol |
| AI-9 | Propylene glycol |
| AI-10 | Hexanols |

Tests performed with these materials indicated that those active ingredients were, in varying degrees, effective for the above purposes. The most effective of the active ingredients listed were those referred to with the legends AI-1 through AI-4. The present invention is directed primarily, but not exclusively, to the use of these active ingredient materials. Generically, these products contain the —OH radical and are alcohols; they are sometimes also referred to as diols or glycols, and in the cases of AI-2, AI-3 and AI-4, as glycol ethers. In this connection, "glycol ethers" conventionally, and as used herein, means ethers made with glycols as the starting materials.

Inasmuch as one phase of the invention relates to treating a solvent composition in order to accelerate the rate at which contaminants will separate from the mass of solvent and into two layers, one relatively free of contaminants and the other having virtually all of the contaminant particles therein, a solvent of the P-150 type was treated using the above active ingredients. In Chart 1, appearing below, the effect of the active ingredients on the settling rate of suspended particles is shown. In the first set of columns on the left, after zero time, it is apparent that no interface has developed in a column height of 100 arbitrary units of height.

FIG. 1/Chart 1 shows that after 15 minutes, the first and fourth columns show no settling has occurred, but the second and third columns show the formation of an interface at 60 and 80 units in height respectively. The last set of columns shows no interface developing in the first and fourth specimens but that an interfaces of 25 and 40 units respectively have developed in the second and third columns. In these sets of columns, the left hand column is a control consisting of used parts washer solvent, the second is such control treated with 2 parts each of EHD or AI-1 and 2 parts water, based on 100 parts solvent. These proportions are expressed herein, and in the claims, as "pph" or parts per hundred. The third column contained the control and 2 parts of AI-1 only.

Figure 2:
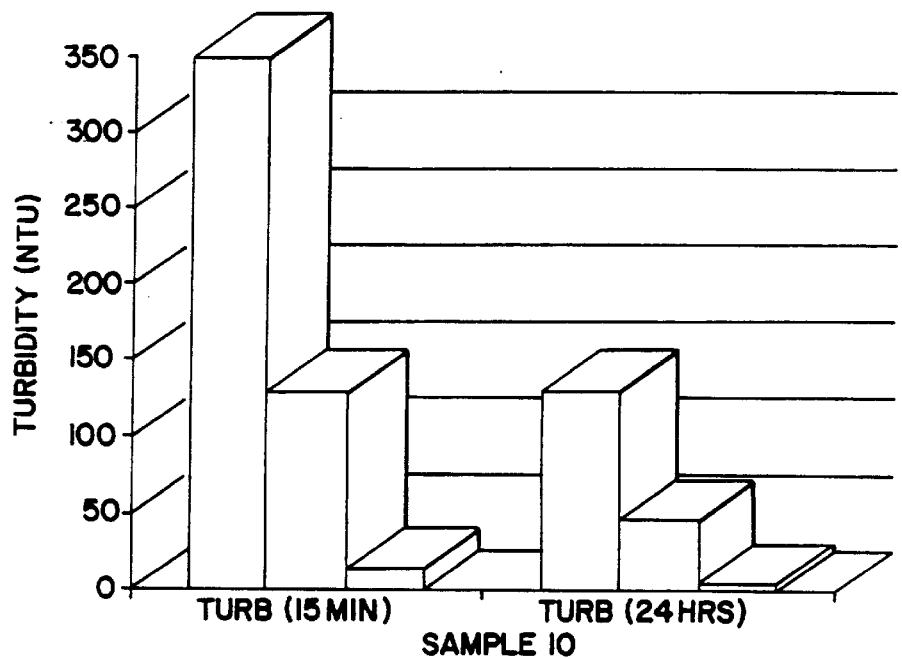
FIG. 2/Chart 2 shows the effect of active ingredients on the turbidity of the supernatant layers.

Additional experiments were conducted as reflected in FIG. 2/Chart 2, of the drawings. These compare the turbidity of a control specimen with two other specimens after 15 minutes and 24 hours respectively.

| COL. | INGREDIENT |
| --- | --- |
| 1 | CTL |
| 2 | CTL plus AI-1 (2 parts) |
| 3 | CTL plus 2 parts ea. of AI-1 and Water |

In FIG. 2/Chart 2 of the drawings, the left hand column in each set represents dirty solvent; the middle columns represent dirty solvent with 2 pph of EHD, and the third column represents 2 pph each of EHD and water. It is clear that the additive, and especially the combination of the additive and water, are very effective to reduce residual contamination in the supernatant layer, thus extending the useful life of the solvent. These preliminary tests showed that the active ingredient additives were effective to clarify the supernatant layer. Next, the matter of recycling was addressed, as follows:

EXAMPLE 1

In keeping with the invention, and as described in more detail below, solvent specimens that were treated with the active ingredient-containing additives discussed above were used in parts washing applications, displaying an extended life relative to untreated solvent. When such solvent, after the extended period, nevertheless became contaminated to the extent that it was visibly dirty and the particulate level in the supernatant was 500 to 2,000 or more ppm, the solvent was treated by settling or centrifuging to eliminate bottom sediment and water ("BS&W"), and then vacuum distilled. Following such distillation, analysis of the distilled solvent revealed that the EHD or active ingredient 2-ethyl-1,3-hexanediol ("EHD") had transferred into the distilled solvent on an almost quantitative basis.

Thereupon, the distilled solvent still containing the active ingredient was used again until it was dirtied to the extent referred to above. This solvent was subsequently treated by removing BS&W, either through long term (24 hours or more) settling or by being subjected to centrifugal extraction. Thereafter, the solvent was again distilled. It was determined that even with a number of repeated distillations, virtually all of the EHD initially present in the supernatant remained there after distillation.

Thus, it was noted that even after settling, the EHD had partitioned almost exclusively in favor of the solvent layer, i.e., almost none remained with the bottom sediment and water. This was considered quite surprising in view of the fact that the EHD was clearly instrumental in causing agglomeration and settling of the suspended contaminant particles. Consequently, EHD was considered to be an extremely advantageous additive in view of its performance. By "performance" is meant the ability to create an interface between solvent and a relatively uncontaminated solvent layer and a lower, contaminant-rich layer; the ability to clarify the supernatant layer making it visibly appear to be more clear and clean, and finally, the ability to remain in the solvent after distillation so as to require little if any replenishment.

In the latter connection, after a number of distillation cycles, such as 3 to 10 cycles or more, small amounts of EHD were sometimes required to be added to bring the solvent up to an initial, desired concentration, such as to 2 to 4 pph.

The foregoing illustrates that such a treatment not only performs the effect of rendering the solvent more effective and longer lasting, but also is an important aspect of recycling, in that a solvent composition, once improved by augmentation with the active ingredient additive, tends to remain improved over an extended lifetime. This is a very important aspect of waste minimization, and a desirable aspect of environmental control generally.

The retention of EHD in the solvent during a distillation is illustrated in the table below, which is discussed herein.

TABLE 2

| SAMPLES | VACUUM (mBAR) | OVERHEAD TEMP. °C. | POT TEMP. °C. | VOLUME (mL) | ADDITIVE CONC. (Wt%) | ADDITIVE AMT. (gm) |
| --- | --- | --- | --- | --- | --- | --- |
| FEED | | | | 650 | 4.00 | 20.48 |
| FRCTN. #1 | 180 | 90–110 | 148 | 125 | 1.32 | 1.3 |
| FRCTN. #2 | 180 | 110–117 | 150 | 132 | 1.85 | 2.0 |
| FRCTN. #3 | 180 | 117–130 | 155 | 140 | 4.10 | 4.6 |
| FRCTN. #4 | 180 | 130–132 | 160 | 110 | 4.28 | 3.8 |
| FRCTN. #5 | 180 | 132–137 | 180 | 85 | 6.11 | 4.2 |
| POT | 180 | | 185 | 48 | 11.59 | 4.5 |
| TOTAL MASS BALANCE | | | | 640 | | 20.40 |

BOILING POINT OF ADDITIVE (EHD) = 243° C. (469.4° F.)

The carrier C-1 has a boiling point ("BP") of 245° C. (469.4° F.). This boiling point is higher than the BP of the highest boiling component of the reference 150° flash point solvent ("P-150") discussed above. A close evaluation of fractional distillation data for the P-150 solvent containing the carrier, shows that the carrier is present in all overhead fractions. This means that the carrier forms a series of azeotropes with P-150. The fact that the concentration of the carrier is greater in higher boiling fractions suggests that the relative azeotrope ratios increase with the concentration of the higher boiling components of the P-150 solvent. Nevertheless, the conclusion that can be drawn from this experiment is that the carrier in fact forms an azeotrope and therefore it is recoverable, and furthermore, it also facilitates the recovery of the higher boiling components of the subject solvent in a fractional distillation process.

Another aspect of the present invention is the cooperation between the solvent treated with the alcohol/diol/glycol/polyol/glycol ether additives with additional additives, sometimes hereinafter referred to as "clarifying additives" which aid in interface formation and a supernatant layer clarification, especially when used with the EHD and similar materials just discussed.

A table of some additives that have proved effective appears below.

TABLE 3

| LEGEND | CLARIFYING ADDITIVE |
|--------|---------------------|
| CA-1 | A mixture of nonyl and butyl-substituted phenol-formaldehyde resins having plural ethoxy or propoxy groups. See illustration below. |
| CA-2 | CA-1 plus an alkyl or aryl sulfonic acid or mixture. |
| CA-3 | A mixture of petroleum naphtha, ammonium alkyl sulfonates and diethylene glycol mono-butyl ether. (DEGBE) |
| CA-4 | A mixture of petroleum sulfonates, esterified polyols and CA-1. |

When one or more of these additives, either individually or as combined, were added to solvent which had been treated by the prior addition of the alcohol/diol/glycol/polyol/glycol ether materials referred to, preferably with a small proportion of water, solvent was again significantly clarified. Specifically, after the addition of the EHD active ingredient material just discussed, the treated solvent was used for parts washing purposes and allowed to become visibly dirty. This point is reached, as discussed in the referenced copending applications, when the total suspended solids concentration in the supernatant phase of the parts washer solvent ("PWS") is from about 500 to 1,500 or more ppm. When this has occurred, the used solvent is a blackish-gray or brownish-black color and is so visibly dirty that users consider it to be no longer effective for parts washing purposes and believe that a change of solvent is indicated.

It is at this point that it is possible to restore some or all of the clarity of the used solvent by adding selected materials or mixtures from Table 3 instead of distillation. The clarifying additives referred to in Table 3 are advantageously added in amounts of from 0.1 pph or less to up to 5 pph of solvent, and are effective when an equal or greater amount of water is added thereto.

Tests have shown that an optimum value in the initial concentration is about 0.2 pph of ingredients; however, these ingredients are effective in amounts from 0.05 pph or less up to 5 or more pph, and are effective with EHD concentrations in the 0.5 to 5% range, preferably about 1 or 2 pph of EHD.

After the clarifying agents have been added to the solvent and it has been used for an additional period of time, further addition of clarifiers may or may not take place. At any rate, when the suspended particle concentration again reaches the range set forth above, i.e., 500 ppm or more of particles in the 20 micron and smaller particle size, the solvent is subject to reclaiming by distillation. For this purpose, the treated solvent is permitted to settle, and/or it is centrifuged to remove bottom sediment and water ("BS&W"). The materials remaining in the supernatant phase are then placed in a distilling apparatus for the purpose of reclaiming solvent.

EXAMPLE 2

After the solvent had been pretreated with the active ingredient and was thereafter clarified one or more times by the addition of the clarifying additive just discussed, the solvent so treated was distilled. Subsequent analysis of the distilled modified solvent indicated that the concentration of EHD had changed little if any. The EHD, besides being unchanged in concentration, remained effective in initially prolonging the life of cleaning solvent in relation to otherwise identical solvent.

EXAMPLE 3

A combination of steps set forth in the foregoing examples was carried out, namely, using initially treated solvent, allowing it to become dirty and to be clarified several times before distillation. Even under these conditions, the distilled solvent still retained a highly effective proportion of EHD. When an analysis for the content was carried out, some additional EHD was added where necessary to restore the EHD level to its original concentration, usually 2 pph.

Referring to the clarifying additives, their performance was beneficial in the overall scheme, but the particular clarifying agent used did not appear to effect the efficacy of the treatment with EHD. Consequently, the inventive process proved that the EHD was an effective additive, with or without service life prolonging clarifying agents, some or all of which were lost in the sedimentation process.

Regarding the performance of the other alcohol/diol/glycol/polyol/glycol ether additive materials, their behavior under distillation seemed to depend on several factors, importantly including the boiling point and the overall compatibility with the solvent. In order of effectiveness, the ethylene glycol mono-butyl ether ("EGMBE") and propylene glycol ethers ("PnB") were more effective than the other materials, and a 2:1 mixture of EGMBE and PnB seemed to perform somewhat better than either one individually, and better than certain of the lower molecular weight additives. Some of the lower molecular weight materials were not as soluble or dispersible in the solvent in the absence of couplers or the like and still others tended to raise the flashpoint. Some had questionable odors or were subject to health hazard inquiries. However, under appropriate conditions, the other ingredients listed in Table 1 were at least somewhat beneficial.

From the foregoing examples, it is apparent that the present invention provides a novel method of recycling cleaning compositions, including the advantages referred to herein and others which are inherent in the invention. As explained above, the examples comprise the use of a treating composition effective to resist fine dispersion of contaminants in said cleaning solvent, said treating composition being substantially inseparable from said solvent by distillation. Or stated another way the examples comprise a treating composition resisting fine dispersion of particulate contaminants within said solvent, said composition also resisting separation from said solvent by distillation. Representatives examples of the manner of practicing the invention having been set forth by way of example, it is anticipated that variations and changes to the described methods will appear to those skilled in the art and that such changes or modifications may be made without departing from the spirit of the invention or the scope of the appended claims.

I claim:

1. A method comprising cleaning and recycling a mixture of a cleaning solvent and a treating composition, said cleaning solvent having been contaminated with impurities through use, said cleaning solvent comprising not more than 20% aromatic solvents and the remainder aliphatic solvents, and having a flashpoint of from about 100° F. to about 250° F., and said treating composition being selected from the group consisting of 2-ethyl-1,3-hexanediol, propylene glycol-n-butyl ether, diethylene glycol mono-butyl ether, and mixtures of said diol and said glycol ethers, said treating composition being present in an amount of from about 0.5 up to about 5 parts per hundred of said solvent and said treating composition being substantially inseparable from said solvent by distillation, cleaning mechanical parts with a mixture of said solvent and said treating composition until said mixture undergoes reduced visual clarity and attains a suspended particle concentration of at least 500 ppm, clarifying said mixture by adding thereto from about 0.01 up to about 5 pph of a clarifying agent and from 0.01 to 5 pph of water, thereby providing a clarified mixture of treated solvent, and reusing said clarified solvent mixture until the suspended particle concentration again reaches at least 500 ppm, separating a supernatant solvent mixture layer containing said treated and clarified solvent mixture from a lower layer rich in said impurities, and thereafter distilling said supernatant solvent mixture layer including said treating composition, recycling said distilled mixture, and thereafter repeating said reusing, clarifying, separating and distilling steps, periodically determining the residual level of said treating composition in said solvent mixture, and adding sufficient additional treating composition to said solvent mixture after said distillation step to maintain the concentration of said treating composition in said solvent mixture in an amount of 0.5 up to about 5 parts per hundred of solvent.

2. A method as defined in claim 1 wherein said treating composition is 2-ethyl-1,3-hexanediol.

3. A method as defined in claim 1 wherein said treating composition is a mixture of from about one to about three parts of diethylene glycol mono-butyl ether and about one to about three parts of propylene glycol n-butyl ether.

4. A method as defined in claim 1 wherein said clarifying agent is selected from the group consisting of aromatic, aliphatic and alkaryl sulfonic acids and sulfonic acid salts, esterified polyols, and alkyl phenol formaldehyde resins capped with alkoxy groups, and mixtures of said acids, said esterified polyols, and said resins.

5. A method as defined in claim 1 wherein distillations are carried out at a pressure of less than 250 millibars.

6. A method of cleaning and recycling a mass of solvent consisting essentially of petroleum cleaning solvent having a flashpoint of from about 100° F. to about 250° F., said solvent being primarily an aliphatic solvent with not more than about 20% aromatic solvent content, said solvent being used for cleaning accumulated residues from automotive, industrial, and other mechanical parts, and being thereby contaminated with impurities, said method consisting essentially of adding to said mass of solvent from about 0.5 up to about 5 parts per hundred of a treating composition, said treating composition resisting fine dispersion of particulate contaminants within said solvent, said treating composition also resisting separation from said solvent by distillation and being selected from the group consisting of $C_5-C_{14}$ alcohols, $C_2-C_8$ diols, $C_6-C_{14}$ polyols, $C_5-C_{14}$ glycol ethers, and mixtures thereof, thereby establishing a desired level of said treating composition in said solvent, washing said parts with said treated solvent until said accumulated residues cause said treated solvent to undergo reduced visual clarity and attain a suspended particle concentration in excess of 500 ppm, thereafter separating said solvent and said treating composition from said accumulated residues by vaporizing and condensing both said solvent and at least a substantial portion of said treating composition to produce a mass of vaporized and condensed cleaning solvent and treating composition, and reusing said vaporized and condensed solvent and treating composition to clean additional parts.

7. A method as defined in claim 6 wherein said treating composition is selected from the group consisting of $C_6-C_8$ alcohols, $C_6-C_8$ diols, and $C_6-C_8$ glycol ethers.

8. A method as defined in claim 7 wherein said alcohols, diols, and glycol ethers are aliphatic.

9. A method as defined in claim 6 wherein said alcohols, diols, and glycol ethers are aliphatic.

10. A method as defined in claim 6 which further comprises additionally cleaning parts with said treated solvent after said vaporizing and condensing step until said solvent again undergoes reduced visual clarity and again vaporing and condensing said solvent and at least a substantial portion of said treating composition by vaporizing and condensing, and thereafter reusing said distilled solvent containing said treating composition.

11. A method as defined in claim 6 which comprises repeatedly performing said parts cleaning and recycling by vaporizing and condensing steps, and periodically checking the concentration of said treating composition in said cleaning solvent, periodically adding additional treating composition after at least one of said vaporizing and condensing steps to maintain a desired concentration of from about 0.5 to about 5 parts per hundred of said treating composition in said solvent.

12. A method as defined in claim 6 which further comprises adding up to five parts of water per hundred parts of solvent to said composition prior to using said solvent for cleaning purposes, and thereafter adding sufficient water to restore said water content to said composition following each of said vaporizing and condensing steps.

13. A method as defined in claim 6 which additionally includes the step, after said solvent reaches a suspended particle separation in excess of 500 ppm, adding a clarifying agent selected from the group consisting of aromatic, aliphatic and alkaryl sulfonic acids and sulfonic acid salts, esterified polyols, and alkyl phenol formaldehyde resins capped with alkoxy groups, and mixtures of said acids, said esterified polyols, and said resins, and thereupon using said solvent again until said suspended particle concentration in excess of 500 ppm level is reached.

14. A method of cleaning and recycling a mass of solvent consisting essentially of petroleum cleaning solvent having a flashpoint of from about 100° F. to about 250° F., said solvent being primarily an aliphatic solvent with not more than about 20% aromatic solvent content, said solvent being used for cleaning accumulated residues from automotive; industrial, and other mechanical parts; and being thereby contaminated with impurities, said method comprising adding to said mass of solvent from about 0.5 up to about 5 parts per hundred of a treating composition, said treating composition resisting fine dispersion of particulate contaminants within said solvent, said treating composition also resisting separation from said solvent by distillation and being selected from the group consisting of $C_5-C_{14}$ alcohols, $C_2C_8$ diols, $C_{10}-C_{14}$ polyols, and $C_5-C_{14}$ glycol ethers, and mixtures thereof, thereby establishing a desired level of said treating composition in said solvent, washing said parts with said treated solvent until said accumulated residues cause said treated solvent to undergo reduced visual clarity and attain a suspended particle concentration in excess of 500 ppm, adding at least one clarifying agent selected from the group consisting of aromatic; aliphatic and alkaryl sulfonic acids and sulfonic acid salts, esterified polyols, and alkyl phenol formaldehyde resins capped with alkoxy groups, and mixtures of said acids and said salts, said esterified polyols, and said alkyl phenol formaldehyde resins capped with alkoxy groups, and thereupon using said solvent again until said suspended particle concentration of 500 ppm level is reached, thereafter separating said solvent and said treating composition from said accumulated residues by vaporizing and condensing both said solvent and at least a substantial portion of said treating composition to produce a mass of vaporized and condensed cleaning solvent and treating composition, and reusing said vaporized and condensed cleaning solvent and treating composition to clean additional part.

15. A method as defined in claim 14 wherein said treating composition is a member selected from the group consisting of ethyl hexane diol, diethylene glycol ethers, propylene glycol ethers, and mixtures of said diols and glycol ethers.

16. A method as defined in claim 14 wherein said treating composition is a member selected from the group consisting of 2-ethyl-1,3-hexanediol, propylene glycol-n-butyl ether, diethylene glycol mono-butyl ether, and mixtures thereof.

17. A method as defined in claim 14 wherein said treating composition is an ethyl hexanediol.

18. A method as defined in claim 14 wherein said treating composition is 2-ethyl-1,3-hexanediol.

19. A method as defined in claim 14 which further includes the step of adding to said solvent, prior to vaporization and condensation, from about 0.01 to about 5 parts per hundred of a clarifying agent causing agglomeration of said particles in the presence of water and said treating composition, thereby establishing given concentration of clarifying agent and, following each of said steps of vaporizing and condensing said solvent, adding further clarifying agent to said solvent to restore said given level of clarifying agent.

20. A method as defined in claim 13 wherein said clarifying agent is aromatic, aliphatic and alkaryl sulfonic acids and sulfonic acid salts.

21. A method as defined in claim 13 wherein said clarifying agent is esterified polyols.

22. A method as defined in claim 13 wherein said clarifying agent is alkyl phenol formaldehyde resins capped with alkoxy groups.

* * * * *